April 3, 1945.  M. S. BROCKMAN  2,372,932
AUTOMATIC PANORAMIC DEVICE FOR CAMERAS
Filed Aug. 21, 1940  2 Sheets-Sheet 1
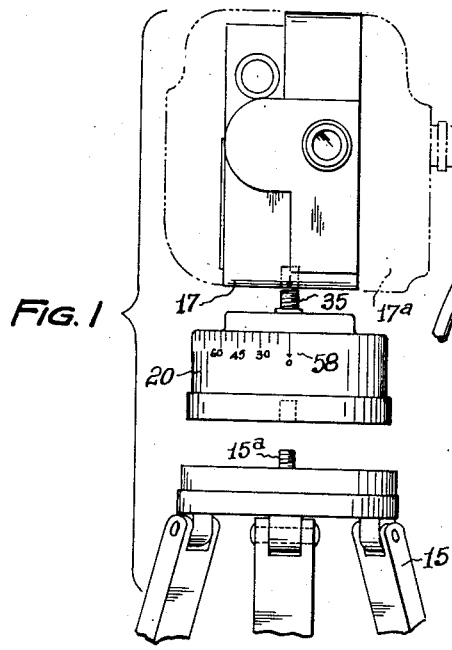
Fig. 1
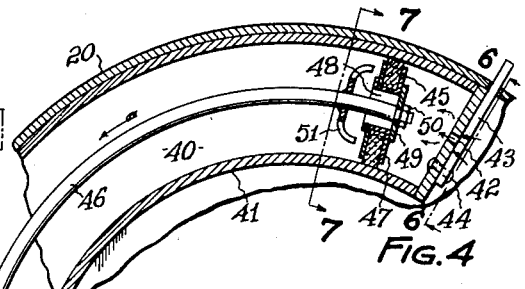
Fig. 4
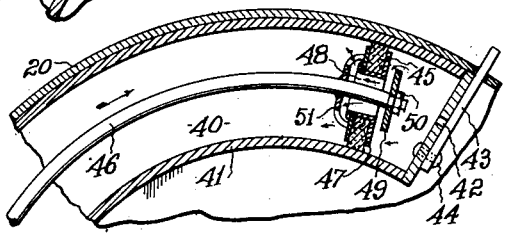
Fig. 5
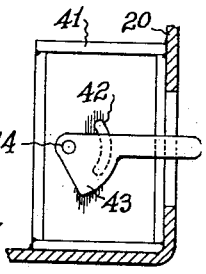
Fig. 6
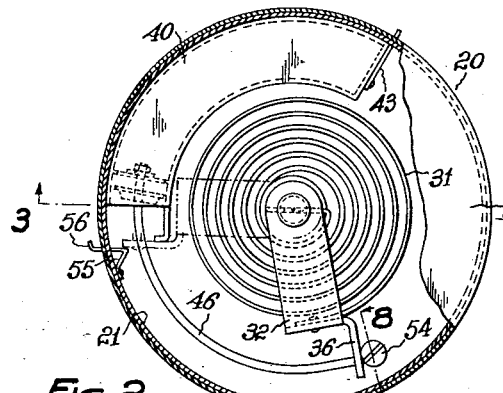
Fig. 2
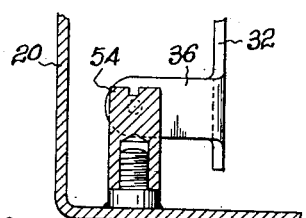
Fig. 8
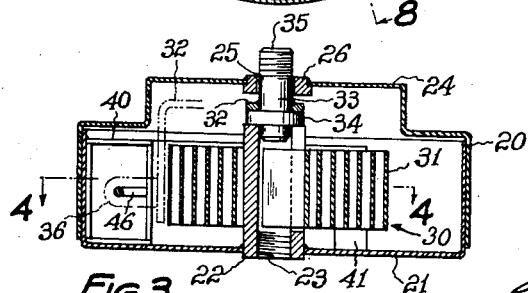
Fig. 3
Fig. 7
INVENTOR.
Morton S. Brockman April 3, 1945.  M. S. BROCKMAN  2,372,932
AUTOMATIC PANORAMIC DEVICE FOR CAMERAS
Filed Aug. 21, 1940  2 Sheets-Sheet 2

INVENTOR.
Morton S. Brockman

Patented Apr. 3, 1945

2,372,932

UNITED STATES PATENT OFFICE 2,372,932

AUTOMATIC PANORAMIC DEVICE FOR CAMERAS

Morton S. Brockman, Cleveland, Ohio

Application August 21, 1940, Serial No. 353,525

16 Claims. (Cl. 88—16)

This invention relates to photography and particularly to the art of taking motion pictures.

As conducive to a clearer understanding of this invention, it may be well to point out that in the taking of motion pictures by amateur photographers the photographer himself very seldom appears in the pictures he takes. This is not always due to the desire of the operator of the camera to remain out of the picture. More often it is due to the inability of the operator to appear in the finished picture in a natural and unsolicitous manner.

While most modern amateur type moving picture cameras are provided with locking devices which permit the camera to operate continuously, and which enable the users thereof to appear in the pictures being taken; yet the sudden appearance and the sudden exit of the operator in the scene is forced and seems very artificial. Subsequent editing of the film does not remove the abruptness of the appearance and furthermore it necessitates a waste of valuable film.

In the past many attempts have been made to equip motion picture cameras with devices which would enable the photographer to appear nonchalantly in the picture. These devices were mostly panoramic attachments which caused the camera to rotate on a vertical axis so that the main object or scene would be swept into view very much like the eye would see it. Panoramic attachments, if the degree of rotation or angle of total view was sufficient, enabled the photographer to step into the main scene before it appeared in the camera angle and also enabled him to step out of the scene after it was out of the picture range of the camera lens. Such pictures not only showed more of the background which naturally added interest to the film, but also presented the photographer naturally, without abruptness and just as though some other person was operating and directing the camera.

It is therefore the primary object of this invention to provide a device which may be attached to a camera to facilitate the taking of panoramic views.

Another object is to provide a device of the type mentioned which operates automatically and which permits the user thereof to appear in the picture in a regular, conventional manner.

A further object is to provide a device of the type set forth which is compact, simple in use, and which can be economically manufactured from standard parts.

Still another object is to provide an automatic panoramic device which operates simultaneously with the camera operating mechanism but which is independent of the mechanism and not connected thereto or operated thereby.

These and other objects and features of the invention will become apparent from a study of the following description and claims together with the accompanying drawings in which like parts are designated by like reference characters and wherein:

Figure 1 is a view of one type of my panoramic device inserted between a conventional tripod head and a small moving picture camera;

Figure 2 is a plan view of the device alone with top part broken away to show the interior construction;

Figure 3 is a vertical sectional view showing the interior construction and assembly;

Figure 4 is an enlarged view of a part of a dash-pot used in this device taken along the line 4—4 of the Figure 3 showing the plunger and its position when the device is in operation;

Figure 5 is a view similar to that of Figure 4 but showing the plunger while it is being set preliminary to its operation;

Figure 6 is a view of the dash-pot speed regulator taken along the line 6—6 of the Figure 4;

Figure 7 is a sectional view of the dash-pot taken along the line 7—7 of the Figure 4;

Figure 8 is a sectional view of the dash-pot stop taken along the line 8—8 of the Figure 2;

Figure 9:
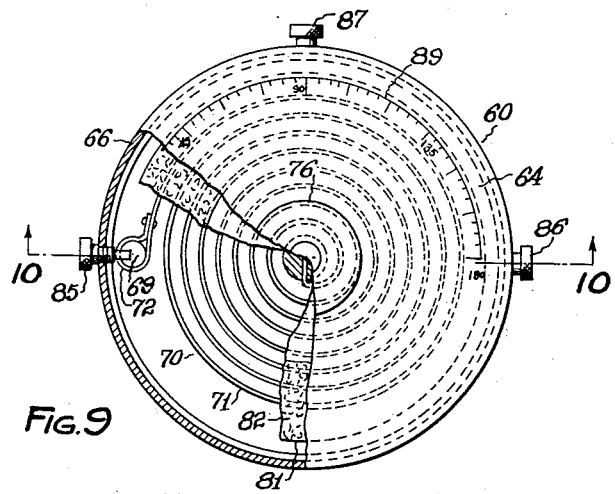
Figure 9 is a plan view of a modified form of the invention with parts broken away to show interior construction and assembly.

Referring now to the drawings, the first page shows a first or preferred form of the device while the second page illustrates a modified and more simple form of device. The manner of mounting, operating and using the two devices is practically the same. In the preferred device the spring motor is regulated by a dash-pot mechanism and in the modified device the speed or reaction of the spring motor is controlled by a simple friction brake or clutch device. Each of the devices will be described separately and in the order set forth.

Preferred form

The comprehensive open or exploded view of Figure 1 shows how a panoramic device embodying this invention is mounted on a conventional tripod 15 and how the camera 17 is mounted on it. The device itself consists essentially of three elements; namely, the housing member or case 20, the spring mechanism or motor 30, and the motor governor or dash-pot 40. Each of these primary members will be described separately hereinafter.

The housing or case member 20 consists of two stamped or cast shells which fit together as a unit. The bottom shell 21 has a base portion which is provided with a nipple or tube 22 threaded at its lower end 23 so as to receive the screw 15a which is on the tripod. When the device is used, this bottom shell 21 fits close against the tripod head and is in substantially fixed or rigid engagement therewith.

The top shell 24 fits over the bottom shell 21 and is attached thereto by some conventional means. This shell 24 is provided with a central hole 25 through which the vertical rotor or turnable member of the motor freely passes. A simple bushing or collar portion 26 is affixed to the top shell to properly align the rotor and to smooth its operation.

The spring mechanism or motor 30 consists of a coiled flat spring 31, the inside or fixed end of which is securely fastened to the nipple 22. To the free end or outside end of the spring 31 there is attached the arm 32. This arm 32 is somewhat L shaped and passes horizontally over the spring 31 and is attached to the turnable member or rotor 33. The rotor 33, sometimes referred to herein as the revolvable member or spindle, has a bearing or collar 34 attached to it just a short distance above its lower end. The lower end of the rotor 33 fits easily into the top opening of the nipple 22 and the collar 34 rests or rides on the smooth end thereof. The arm 32 is attached to the rotor 33 just above the collar 34. The top end 35 of the spindle 33, the portion which is exposed, is threaded so as to engage the camera 17 just as the tripod screw 15a ordinarily does. Finally there is extending outwardly and horizontally from the arm 32 at the point where it is attached to the coiled spring 31, a simple tab 36 which engages the governor 40 and also acts as a stopper.

The pneumatic brake device or governor 40 is curved and extends part way around the side of the motor 30. It consists of a chamber 41 which is attached to the housing member 20 but which here happens to be rectangular in cross-section instead of round as are the conventional dash-pot cylinders. A cylindrical chamber may be used instead of the one shown in the drawings. The closed end of the chamber 41 is provided with a small opening to admit air slowly when the device is in operation. This opening is in the form of a slot and is indicated in the drawings by the character 42. The governor operates on vacuum instead of on compression and in order to control the return-to-normal speed of the piston member 45, the size of the slot 42 may be varied by the adjustment of the valve 43. This valve 43 is clearly illustrated in the Figure 6 and is simply a thin blade which fits closely over the closed end of the chamber 41 adjacent to the slot 42. The blade pivots on the screw 44 and is held in position therewith after the proper speed of the device is determined. The piston head 45 is made of conventional packing material such as leather or felt and which is held between suitable plates and suitably treated so as to make an air-tight contact with the chamber walls. Devices of this type are well known in the art.

In order to speed and to ease the setting of the device, just before its automatic operation, the piston member 45 is constructed so that the air in the chamber 41 may be quickly exhausted through it rather than through the fixed slot 42. The piston head 45 fits very loosely on the rod 46 so that air may easily pass through its center, or in other words, at the opening 48 through which the piston rod 46 passes. The movement of the head 45 is restricted on the rear by the flat washer 49 which closes the opening 48 so as to create a vacuum in the chamber 41 when the device is in operation. This washer 49 is held in place by the small nut 50 which engages the inner end of the rod 46. Similarly the movement of the head 45 is restricted on the front by the perforated cup-like portion 51 which is fastened to the rod 46. The perforated cup-like portion 51 allows the air in the chamber 41 to escape rapidly past the washer 49 and through the opening 48 when the device is being manually set for operation. At this point it should be clearly pointed out that the valve device just described and formed by the piston member elements mentioned is only one of the many different types of valves suitable for use with this device.

The piston rod 46 is also curved as shown and its outer end is attached to the tab 36 on the arm 32. The normal position of the piston member 45 is fixed by the stop 54 which is mounted on the bottom shell 21 of the housing member. The tab 36 on the arm 32 hits the stop 54 when the piston member 45 nears the open end of the chamber 41. The length of the chamber 41 and the position of the stop 54 determine the degree of arc through which the camera is turned and these may be made or positioned to suit the demand of the ultimate users.

A small spring catch 55 is provided which holds the piston head 45 in the set position just prior to its automatic operation. This catch 55 engages the tab 36 and is easily released manually by pulling on the extension portion 56 of the catch which projects through the housing member 20. This catch permits the photographer to set the camera in operation before allowing the panoramic device to come into operation. Thus he is enabled to take some of the picture while the camera is held steady and before it is swung into the panorama view. A very smooth and natural effect is thus procured.

Other catches may be similarly installed on the housing between the stop 54 and the catch 55 so that panoramic views of more acute angles may be obtained. Certain indicia 58 are marked on the housing in a proper spot thereon to show the operator in what direction and through just what angle the camera will start and continue to turn. The proper starting spot referred to indicates the general direction of the camera lens when the panoramic device is in the normal position as shown in the Figure 1.

Modified form

The modified form of the invention consists of a housing member 60, a spring motor 70 and a brake or governor 80 just as in the preferred form. These primary elements too will be described in detail and in the order just set forth.

The housing member 60 consists of a bottom shell portion 61 which is provided with means for engagement with the tripod screw 15a which in this case is also a simple short internally threaded pipe or nipple 62. The bottom shell 61 has a peripheral flange 63 which facilitates the mounting thereon of the top shell portion. The top shell portion 64 has a central hole 65 through which the rotor or spindle of the motor freely passes. The lower edge of the side wall 66 is drilled and tapped for three or four small screws 67. The inside top surface 68 of the shell 64 is made smooth and may be polished so as to provide a suitable braking surface for the friction governor hereinafter described in detail. The housing member 60 formed by the two shells 61 and 64 is firmly and rigidly mounted on the support or tripod 15 just as is the preferred device heretofore described.

The spring motor 70 consists of a flat metal helico-coil spring 71, the outer or fixed end 72 of which is attached to the bottom shell 61 by means of the pin 69. The inner or free end of the spring 71 is attached to the turnable rotor or spindle 73. The bottom end 74 of the spindle fits into and slides vertically in the top opening of the nipple 62. The upper end 75 of the spindle projects through, turns horizontally and slides vertically in the central hole 65 of the top shell 64. The exposed end of the rotor 73 has a knurled collar 76 attached thereto and spaced slightly from the top surface of the top shell 64. This exposed end of the spindle 73 is also provided with a screw thread which engages the camera 17 in place of the regular tripod screw 15a. Turning the knurled collar 76 to the right or clockwise tightens or winds the spring of the motor 70.

The governor 80 or return-to-normal-speed controller is simply a friction brake device which consists of a disk 81 welded or otherwise firmly attached to the rotor 73. This disk 81 has fastened to it a thin disk or ring 82 of a suitable braking material such as leather which adheres to the smooth inside top surface 68 of the housing member commensurate with the pressure applied thereto.

On either side of the spring 71 there are flat washers 77 and 78. The top washer 77 contacts the disk 81 and the bottom washer 78 is adjacent to the top edge of the nipple 62. In order to provide additional and sufficient braking pressure for the governor 80, a second or supplementary wire compression spring 83 is inserted between the washer 78 and the bottom shell 61 and around the nipple 62. A third washer 79 fits between the shell 61 and the spring 83, the thickness of which determines the degree of force applied to the governor and therefore determines to a large extent the speed of operation of the device.

In order to prevent the spindle 73 and the camera 17 thereon from spinning and making more than one complete revolution, suitable stops are provided. These stops are on the housing and are engaged by the metal disk 81. Specifically, the disk 81 has a small depending tab 84 on its edge which hits the screw 85 which projects through the housing shell 64.

Figure 10:
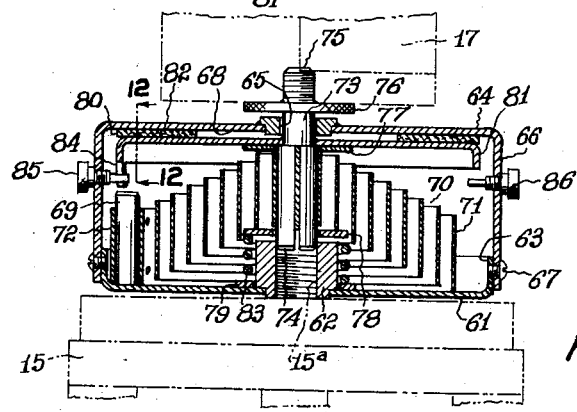
Figure 10 is a vertical sectional view of the device in normal position taken along the line 10—10 of the Figure 9.
Figure 11:
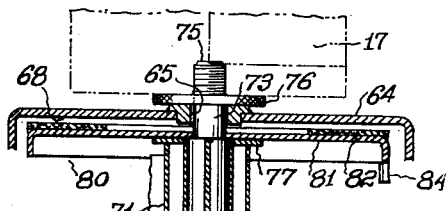
Figure 11 is a view of a part of that shown in the Figure 10 showing the governor released and the motor energized about ready for automatic operation.
Figure 12:
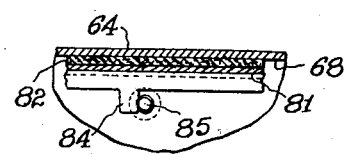
Figure 12 is a vertical sectional view taken along the line 12—12 of the Figure 10.

When the depending tab 84 and the screw 85 are in contact as shown in the Figure 10, the device is in its normal position. There is a similar screw 86 on the opposite side of the case or housing member 60, which, when contacted by the tab 84, indicates to the photographer that the device is in a position for taking a panoramic view of 180°. An intermediate stop screw 87 is also mounted on the device for use when a panoramic view of only 90° is desired. Incidentally, by releasing the screws 86 and 87 so that only the one screw 85 is permitted to engage the tab 84, a cycloramic view may be obtained with this device.

The speed of operation of this device may also be regulated or set by the tightening or loosening of the tension of the spring 71. This can easily be done by turning the screws 85, 86 and 87 so that the tab 84 will clear and pass them freely to make more than one complete revolution and then resetting the screw 85 and either of the screws 86 and 87. In practice, inasmuch as the friction type governor is more easily affected by temperature and climatic conditions, the speed-of-operation adjustment is more easily made by manipulating the screws 85, 86 and 87 than by attempting to regulate the tension of the supplemental spring 83. With this device it may become necessary for the user to experiment a bit before mounting the camera thereon to determine the correct speed of operation. For this reason the screws 85, 86 and 87 and the collar 76 are knurled for convenient manipulation.

This device is set by pressing on the collar 76 (or the camera 17) sufficiently to release the brake or governor 80 and then allowing it to rise at the particular point that the panorama picture is to be started. Depressing the spindle 73 until the collar 76 almost touches the shell 64 separates the ring 82 from the polished surface 68 of the housing member sufficient to permit free movement thereof. The top of the shell 64 is marked off in degrees to assist the photographer in aiming or positioning the camera. These indicia are indicated in the Figure 9 by the character 89.

While not shown in the drawings of the modified form of the device, a suitable catch similar to the catch 55 of the preferred device may be mounted on the housing to permit the user to lock the device in the set position.

Among the many advantages found in this invention is the important feature which permits the camera to move through an arc of a predetermined number of degrees in a natural, smooth, and steady manner as distinguished from the prior art devices which operate through complex gears and pawls and which are consequently jerky and intermittent in their operation. Another advantage this device has over earlier devices is that no keys or special winding of the motor is required. The instant spring motor is energized almost simultaneously with the mounting of the camera. The camera itself acts as the winding key.

It will now be clear that there are provided by this invention automatic panoramic devices for cameras which accomplish the objects set forth. While the invention has been illustrated and described in two specific forms and while certain special language has been used, it is to be understood that the embodiment of the invention as disclosed is suggestive only and is not to be considered in a limiting sense. It is to be further understood that there may be other forms or adaptations of the invention. For example, a hydraulic dash-pot may be substituted for the pneumatic dash-pot shown in the preferred form of the invention. And those modifications are also considered to be within the broad scope of the invention as no limitations upon it are intended other than those imposed thereon by the breadth of the appended claims.

I claim:

1. A panoramic device for a motion picture camera, including a housing, a rotary member carried by the housing having means to support a camera, a second member in the housing supporting the rotary member and having means to engage a support, a coil spring in the housing affixed at one end thereof to the second member, an arm connected to the rotary member and to the other end of the spring and having a projecting part, a dash pot in the housing including a cylinder and a piston in the cylinder having a rod connected to said projecting part of the arm, and a stop in the housing engageable with said projecting part of the arm to limit rotation of the camera.

2. A panoramic device in accordance with claim 1, wherein there is a spring catch carried by the housing and releasably engaged with the projecting part of the arm so as to prevent rotation of the spindle under the influence of the energy stored in the coil spring.

3. A panoramic device in accordance with claim 1, wherein there is means carried by the housing and releasably engaged with the projecting part of the arm so as to prevent rotation of the spindle under the influence of the energy stored in the coil spring.

4. A panoramic device for a motion picture camera including a housing, a rotary spindle carried by the housing having means at one end to support a camera, a bearing member in the housing receiving the opposite end of the spindle therein and having means to engage a tripod or like support, a coil spring in the housing connected at one end to the rotary spindle, means to secure the opposite end of the spring in fixed relation to the housing, a member in the housing connected to the spindle to rotate therewith and carrying a stop and means extending within and carried by the housing and engageable with the stop to limit rotation of the rotary spindle and thereby the camera.

5. A panoramic device in accordance with claim 4, wherein the member which carries the stop is slidably mounted for movement into engagement with a part of the housing so as to additionally control the rate of speed of rotation of the spindle.

6. A panoramic adapter for a camera, comprising a stationary housing, a movable camera carrying spindle mounted on the housing for rotatable and vertical sliding movement with respect thereto, a combined driving and lifting mechanism mounted in the housing and connected to said spindle for causing rotation and vertical sliding movement thereof when the energy stored therein is released, braking means within the housing and movable into engagement with the latter by said combined mechanism for controlling the speed of rotation of said spindle, said braking means being released and the combined mechanism being simultaneously energized upon downward movement of the spindle and rotation of the latter in one direction, and releasable means for holding the spindle against rotation in the opposite direction by the energy thus stored within said combined mechanism.

7. The panoramic adapter described in claim 6 and further characterized by the housing and spindle having co-acting means for regulating the extent of rotation of the spindle under the influence of the energy stored in the combined mechanism.

8. A panoramic adapter for a camera, comprising a stationary housing having means thereon engageable with a rigid support, a movable camera carrying spindle mounted on the housing for rotatable and vertical sliding movement with respect thereto, a combined driving and lifting mechanism mounted in the housing and connected to said spindle for causing rotation and vertical sliding movement thereof when the energy stored therein is released, braking means within the housing and movable into engagement with the latter by said combined mechanism for controlling the speed of rotation of said spindle, said braking means being released and the combined mechanism being simultaneously energized upon downward movement of the spindle and rotation of the latter in one direction, and releasable means for holding the spindle against rotation in the opposite direction by the energy thus stored within said combined mechanism.

9. A panoramic adapter for a camera, comprising a stationary housing, a camera carrying slidable and rotatable spindle mounted in said housing, said housing having indicia thereon arranged concentrically with respect to said spindle so as to indicate the extent of rotation of the spindle and camera carried thereby, a combined driving and lifting mechanism mounted in the housing and connected to said spindle for causing rotation and vertical sliding movement thereof when the energy stored therein is released, automatic braking means carried by the combined mechanism and engageable with the housing for controlling the speed of rotation of the spindle and camera carried thereby, said braking means being released and the combined mechanism being energized upon downward movement of the spindle and rotation of the latter in one direction, and releasable means for holding the spindle and camera carried thereby against rotation in the opposite direction by the energy thus stored within said combined mechanism.

10. A panoramic adapter capable of being temporarily attached to a motion picture camera, comprising a stationary member having a bearing portion thereon, a movable camera supporting member mounted on the stationary member and having an arbor portion slidably and rotatably engageable with said bearing portion, a motor device having means for rotating said arbor and thereby the camera supporting member, and means carried by one of said members and engageable with the other of said members for controlling the speed of rotation of the camera supporting member under the influence of the energy stored within the motor device, said controlling means being released and energy stored within the motor device upon a combined downward and rotative movement of the arbor portion of the camera supporting member in one direction.

11. A panoramic adapter for a camera, comprising a stationary housing, a vertically movable and rotatable camera supporting spindle mounted in the housing, and a motor contained in the housing for rotating the spindle and camera in one direction and for normally supporting the spindle and thereby the camera in a vertically extended position with respect to said housing, said motor being energized upon downward manual movement of the camera carrying spindle toward the housing and subsequent rotation thereof in a direction opposite to said first-named direction.

12. A panoramic adapter for a motion picture camera, including a housing, a spindle in the housing having a threaded portion to engage and support a camera, a nipple in the housing rotatably supporting the spindle and having a threaded portion to engage a tripod screw or like support, a coil spring in the housing surrounding the spindle and having one of its ends connected to the nipple, an arm connecting the spindle and the opposite free end of the spring so as to rotate the spindle upon release of the energy stored in said spring, a member projecting from said arm, a dash pot in the housing including a cylinder and a piston therein having a rod connected to said projecting member of the arm, and a stop in the housing engageable with said projecting member of the arm to limit rotation of the camera supporting spindle by the energy stored within said spring.

13. A panoramic adapter in accordance with claim 12, wherein the housing is cylindrical and wherein the cylinder and the rod of the piston are each curved to substantially conform to the curvature of the housing.

14. A panoramic adapter in accordance with claim 12, wherein there is a catch carried by the housing and releasably engaged with the projecting member of the arm so as to prevent rotation of the spindle under the influence of the energy stored in the spring.

15. The panoramic adapter for a camera set forth in claim 11 which is further characterized by having means thereon for governing the speed of rotation of the spindle.

16. The panoramic adapter for a camera set forth in claim 11, which is further characterized by having means thereon for regulating the degree of rotation of the spindle.

MORTON S. BROCKMAN.